United States Patent
Pryce Lewis et al.

(10) Patent No.: US 8,227,025 B2
(45) Date of Patent: Jul. 24, 2012

(54) CONDUCTIVE POLYMER COATINGS AND METHODS OF FORMING THE SAME

(75) Inventors: Hilton G. Pryce Lewis, Lexington, MA (US); Erik S. Handy, Malden, MA (US)

(73) Assignee: GVD Corporation, Cambridge, MA (US)

( * ) Notice: Subject to any disclaimer, the term of this patent is extended or adjusted under 35 U.S.C. 154(b) by 844 days.

(21) Appl. No.: 12/262,340

(22) Filed: Oct. 31, 2008

(65) Prior Publication Data

US 2009/0117268 A1   May 7, 2009

Related U.S. Application Data

(60) Provisional application No. 61/001,789, filed on Nov. 2, 2007.

(51) Int. Cl.
*C23C 16/00* (2006.01)

(52) U.S. Cl. .................. 427/205; 427/255.28; 427/255.6

(58) Field of Classification Search .................. 427/205, 427/248.1, 255.28, 255.6, 255.7, 301, 331, 427/337, 340, 402, 419.2, 419.5, 419.8, 374.5, 427/419.1
See application file for complete search history.

(56) References Cited

U.S. PATENT DOCUMENTS

| | | | | |
|---|---|---|---|---|
| 5,225,495 A | * | 7/1993 | Han et al. | 525/327.4 |
| 5,380,557 A | | 1/1995 | Spiro | |
| 5,740,016 A | * | 4/1998 | Dhindsa | 361/704 |
| 5,888,591 A | | 3/1999 | Gleason et al. | |
| 2006/0269664 A1 | * | 11/2006 | Gleason et al. | 427/248.1 |
| 2007/0235890 A1 | | 10/2007 | Pryce Lewis et al. | |

FOREIGN PATENT DOCUMENTS

JP    04053115 A   *   2/1992

OTHER PUBLICATIONS

Derwent Abstract of JP 04053115 A, 1992.*

* cited by examiner

*Primary Examiner* — Matthew Daniels
*Assistant Examiner* — Dennis Cordray
(74) *Attorney, Agent, or Firm* — Pabst Patent Group LLP

(57) ABSTRACT

Conductive polymer coatings and methods of forming the same are provided.

29 Claims, No Drawings

CONDUCTIVE POLYMER COATINGS AND METHODS OF FORMING THE SAME

RELATED APPLICATIONS

This application claims priority to U.S. Provisional Patent Application Ser. No. 61/001,789, filed Nov. 2, 2007, and entitled "Conductive Polymer Coatings and Methods of Forming the Same", which is hereby incorporated by reference.

FIELD OF INVENTION

The invention relates to conductive polymer coatings and methods of forming the same.

BACKGROUND OF INVENTION

Conductive polymer coatings are formed of polymers which are intrinsically electrically-conductive, and do not require incorporation of electrically-conductive additives (e.g., carbon black, carbon nanotubes, metal flake, etc.) to support substantial conductivity of electronic charge carriers. Conductive polymer coatings may be used in a variety of applications including electromagnetic interference (EMI) shielding, antennas, electrostatic discharge, displays, photovoltaic devices, chemical/biological sensors, data- or charge-storage devices, resistive heaters, and transistors. Examples of conductive polymers include poly(ethylene-3,4-dioxythiophene) (PEDOT), polyaniline (PAni), polypyrrole (PPy), poly(p-phenylene vinylene) (PPV), polynaphthalene, and polyacetylene.

Certain conventional methods of forming conductive polymer coatings involve depositing a liquid polymer solution, for example, by spray-, dip- or spin-coating techniques. The resulting coatings may be inhomogeneous due to poor solution wetting of the surface. This inhomogeneity can cause the coating to have non-uniform properties, amongst other problems.

SUMMARY OF INVENTION

Conductive polymer coatings and methods of forming the same are provided.

In one aspect, a method of forming a conductive polymer coating on a surface is provided. The method comprises the steps of contacting said surface with a gaseous metal-containing oxidant, thereby forming an oxidant-enriched surface; and contacting said oxidant-enriched surface with a gaseous polymerizable species thereby forming a conductive polymer coating on the surface. The gaseous polymerizable species is selected from the group consisting of metal-organic compounds, pyridines, phenanthrolines, furans, heteroarenes with more than one ring heteroatom, oligomers of thiophenes, oligomers of pyrroles, oligomers of anilines, benzenoid arenes, and non-benzenoid aromatic compounds.

In some embodiments, the surface may be contacted with more than one gaseous polymerizable species (resulting in copolymer and/or layered polymer coatings) and/or more than one gaseous metal-containing oxidant.

In another aspect, a method of forming a conductive polymer coating on a surface is provided. The method comprises the steps of contacting said surface with a gaseous polymerizable species thereby forming a polymerizable species-enriched surface and contacting said polymerizable species-enriched surface with a gaseous metal-containing oxidant, thereby forming a conductive polymer coating on said surface. The gaseous polymerizable species is selected from the group consisting of arenes, heteroarenes, and metal-organic compounds.

In some embodiments, the surface may be contacted with more than one gaseous polymerizable species (resulting in copolymer and/or layered polymer coatings) and/or more than one gaseous metal-containing oxidant.

In another aspect, a method of forming a conductive polymer coating on a surface is provided. The method comprises the steps of contacting said surface with a gaseous metal-containing oxidant and contacting said surface with a gaseous polymerizable species, thereby forming a conductive polymer coating on said surface. The gaseous polymerizable species is selected from the group consisting of arenes, heteroarenes, and metal-organic compounds. The method further comprises the step of exposing said conductive polymer coating to a particle forming agent, thereby forming metallic particles within the conductive polymer.

Other aspects, embodiments and features of the invention will become apparent from the following detailed description of the invention when considered in conjunction with the claims.

DETAILED DESCRIPTION

Conductive polymer coatings and methods of forming the same are disclosed. These methods comprise oxidative polymerization techniques to form conductive polymer coatings on surfaces. In one embodiment, the surface may first be contacted by a gaseous metal-containing oxidant (thus forming an oxidant-enriched surface), then contacted by a gaseous polymerizable species, forming the conductive polymer coating on the surface. In another embodiment, the surface may first be contacted by a gaseous polymerizable species, then contacted by a gaseous metal-containing oxidant, thus forming the conductive polymer coating on the surface. This approach may employ a subambient temperature medium to reduce the temperature of the surface. The subambient temperature medium may be employed to encourage adsorption of the polymerizable species to the substrate and may be used for penetrating surface porosity with the conductive polymer coating thus formed. Irrespective of whether an oxidant-enriched surface is formed first or a polymerizable species-enriched surface is formed first, the temperature of the substrate may be changed during conductive polymer coating formation (i.e., varied with time) to achieve a coating whose conductivity varies through its thickness. The substrate temperature may also be varied laterally (such as with a patterned heating or cooling approach), resulting in a conductive polymer coating whose electrical conductivity varies spatially (laterally), i.e., from point to point across the coated substrate. Varying the stage temperature both laterally and with time may produce a coating whose electrical conductivity varies in three spatial dimensions, i.e., both through its thickness and across its length and width. Such a coating may be useful for EMI shielding, among other applications.

Porous substrates (e.g., open-cell foams) which are heated or cooled from one side (such as with a temperature-controlled sample stage) may exhibit a temperature gradient through their thickness. Coatings formed using the methods described herein may deposit on such substrates at varying points through the substrates' thickness. Hence, the coatings may exhibit different electrical conductivities at different points through the substrates' thickness (i.e., different coating conductivities at different depths of penetration into the substrate). Alternatively, a first conductive polymer coating can be deposited on such substrates using methods described herein. This coating can then be heated (e.g., resistively) during deposition of a subsequent conductive polymer coating(s) so that the electrical conductivity of the subsequent coating(s) can be varied in time, spatially, or both.

In some methods, the conductive polymer coating may then be contacted with a particle forming agent (which may be a reducing agent). The particle forming agent may form metallic particles within a conductive polymer coating that contains metallic species (e.g., residue from the metal-containing oxidant or metal-containing species deliberately incorporated into the conductive polymer coating). The metallic particles thus formed may improve the electrical conductivity of the conductive polymer coating.

In yet another embodiment, the surface may be contacted by a gaseous metal-containing oxidant (thus forming an oxidant-enriched surface), then contacted by a gaseous polymerizable species, forming the conductive polymer coating on the surface. Alternatively, the surface may be contacted with a gaseous polymerizable species, forming a polymerizable species-enriched surface, then contacted with a gaseous metal-containing oxidant, forming a conductive polymer coating. This conductive polymer coating may then be contacted with a particle forming agent (which may be a reducing agent). The particle forming agent may form metallic particles within a conductive polymer coating that contains metallic species (e.g., residue from the metal-containing oxidant or metal-containing species deliberately incorporated into the conductive polymer coating). The metallic particles thus formed may improve the electrical conductivity of the conductive polymer coating.

The conductive polymer coating formed by any of these methods may be electromagnetic shielding layers. Metallic particles in the conductive polymer coatings may improve the shielding effectiveness of the electromagnetic shielding layers. Exposing conductive polymer coatings to a reducing agent may render the conductive polymer coatings n-type. N-type conductive polymer coatings formed using these methods may be useful in conjunction with p-type conductive polymer coatings for forming diodes and transistors.

Any of these methods of forming a conductive polymer coating may employ one or more gaseous polymerizable species and may employ one or more gaseous metal-containing oxidants. The surface may be contacted with a gaseous base, which can be used to neutralize any acid formed during the polymerization process. (This acid may degrade the growing conductive polymer film if the gaseous base does not contact the surface.) The gaseous polymerizable species may contact the surface in patternwise fashion, such as through a mask. The gaseous metal-containing oxidant may contact the surface in patternwise fashion, such as through a mask. Patternwise contact of the gaseous polymerizable species and patternwise contact of the gaseous metal-containing oxidant can patternwise-form conductive polymer coatings. Patterned conductive polymer coatings may be useful as electrodes or electromagnetic interference shielding, for example.

The methods can involve a simple, solventless, low temperature vacuum technique for depositing electrically-conductive (or "intrinsically-conductive") polymer coatings on a range of substrates. The oCVD (Oxidative Chemical Vapor Deposition) technique produces pure coatings of conductive polymers such as PEDOT (polyethylene-3,4-dioxythiophene), polypyrrole (PPy), and PPy derivatives. The oCVD coatings are highly conformal to even the most complicated surface topologies, including particles, foams, and fabrics.

The oCVD conductive coatings are deposited in an all-dry process such that liquid wetting issues do not come into play, and inhomogeneity issues related to poor wetting are avoided. Rather than using a solution, a reactive gas diffuses around the structure (and through it, in the case of a fabric substrate) and, when oxidized, polymerizes on contact. In the case of a fabric, this gently "shrink-wraps" each individual fiber with an electrically-conductive polymer coating. As such, oCVD preserves the original geometry of the substrate and affords a robust, conformal conductive polymer coating with tunable properties. This is important for high-surface-area substrates in applications ranging from electromagnetic interference (EMI) shielding to ultracapacitors to electrical resistance heating.

Conductive polymer coatings formed using the method described herein are useful for many applications including EMI shielding, particularly when the coatings are impregnated with metallic species, forming "conductive composite" coatings. Conductive polymer coatings are disclosed that can meet military requirements for EMI shielding across the full EMI spectrum. Military applications typically require higher shielding effectiveness thresholds than commercial applications across the spectrum (80 dB vs. 40 dB). Homogeneous conductive polymer (without metallic species) alone may not achieve shielding effectiveness values more than 25-50 dB unless they are very thick and highly conductive. For example, even some of the highest-conductivity conductive polymers (e.g. polyaniline and polypyrrole, having conductivities of 560 and 290 S/cm, respectively) may be deposited at coating thicknesses greater than 100 microns in order to achieve 80 dB shielding effectiveness at microwave frequencies. The inclusion of metallic species within the conductive polymer coating is a method of increasing the overall conductivity and shielding effectiveness of the coating while minimizing weight.

The conductive polymer coatings disclosed herein utilize several different attenuation mechanisms as a means to achieve high shielding effectiveness, and may comprise:

A conductive polymer to provide absorptive EMI shielding capability

Metallic species to provide absorptive EMI shielding capability

Metal particles to provide high conductivity, reflective shielding capability, and enhanced shielding through the mechanism of multiple reflections In addition to providing higher conductivity, metals also offer alternate mechanisms for EMI attenuation. Conductive polymers may attenuate EMI principally through absorption. In contrast, metals may attenuate EMI through two mechanisms: reflection and multiple reflections. (Some higher conductivity conductive polymers may also attenuate EMI through reflection).

One key element of the conductive polymer coatings disclosed is that the conductive polymer and the metallic species can complement one another to address different parts of the EMI spectrum. EMI attenuation by reflection decreases with increasing frequency, whereas attenuation by absorption increases with increasing frequency. Hence, metallic species may address the lower frequencies of the spectrum while the conductive polymer coating may address the higher frequencies.

The use of a conductive polymer coating with metallic species also provides more parameters by which an optimal EMI shielding material can be designed. For instance, the conductivity of the conductive polymer coating can be tuned to allow specific frequency bands to be targeted (a feature not available with metals). The influence of multiple reflections can be optimized by adjusting the chemical identity, form factor, size range, and size distribution of metallic species within the conductive polymer coating.

Numerous aromatic species (arenes and heteroarenes, metal-organic compounds, and monomers and oligomers) can be oxidized to form electrically-conductive polymer coatings using the process disclosed. The metal-containing oxidant may be introduced into the vacuum chamber before, during, and/or after the aromatic species is introduced in order to form the conductive polymer coating. Multiple polymerizable species may be introduced so as to form copolymers and/or layers of different coatings. Patterned deposition of aromatic species and/or oxidant yields patterned conductive polymer coatings. Metallic species may remain in the film after formation of the coating as oxidizer residue or polymer constituents (i.e., metal-organic species deliberately incorporated into the polymer coating). These metallic species may increase the overall electrical conductivity of the coating and improve the EMI shielding performance of the coating. Exposure of a metal ion-containing conductive polymer coating to a particle forming agent (e.g., a reducing agent), for example, yields metal particles (which may be zero-valent) within the coating, further improving coating conductivity and shielding efficiency. So-called "n-type" (or "n-doped") conductive polymers may be formed in this way, as well (i.e., on exposure to a reducing agent). N-type conductive polymers are especially useful when used in combination with "p-type" (or oxidatively-doped or "p-doped") conductive polymers for forming diodes (e.g., light-emitting diodes), transistors, photovoltaics, and related devices.

Processes for forming the conductive polymer coatings can involve introducing one or more gaseous polymerizable species into a vacuum chamber, which polymerize on surfaces within the chamber when they come in contact with one or more gaseous, metal-containing oxidants. The oxidant is also introduced into the chamber in the vapor phase, having been sublimed from a solid (e.g., a resistively-heated metal filament or a fine powder in a heated crucible), for example. Optionally, a gaseous base may also be introduced into the chamber to neutralize acid formed during the polymerization, acid which might otherwise chemically-degrade the growing film. The result is an all-dry (solventless) conductive film formation process. Such a process lends itself well to solvent-sensitive surfaces, such as surfaces on which solvent-erodible coatings have already been deposited.

When the coating is formed on solvent-insensitive surfaces, the coating may be rinsed with a solvent to remove impurities (e.g., unreacted monomer, unreacted oxidant, reduced oxidant, low-molecular-weight polymer chains, etc.). Alternatively, the solvent-washing step may not be used if the performance of the coating is improved by the presence of impurities. As such, the conductive polymer coating may comprise impurities from the coating formation process. For example, metallic ions in the film will improve the electromagnetic interference (EMI) shielding efficiency of the electrically-conductive polymer coating. For convenience, certain terms employed in the specification and appended claims are collected here.

The term "conductive polymer" as used herein can refer to polymers which are intrinsically electrically-conductive, and which do not require incorporation of electrically-conductive additives (e.g., carbon black, carbon nanotubes, metal flake, etc.) to support substantial conductivity of electronic charge carriers. Charge carriers believed to be responsible for electrical conductivity in conductive polymers include polarons, bipolarons, and solitons.

The term "gaseous polymerizable species" includes arenes and heteroarenes. The term "gaseous polymerizable species" includes monomers, oligomers, and metal-organic compounds. Any of the arenes and heteroarenes and metal-organic compounds may have substituents. The gaseous polymerizable species disclosed herein may not necessarily be gases at room temperature and atmospheric pressure. If such species are liquids or solids, for example, they may be evaporated at reduced pressure or by heating or both in order to carry out the disclosed process.

The term "arenes" is art-recognized and can refer to aromatic hydrocarbons. Examples of arenes include benzenoid arenes and non-benzenoid aromatic compounds. The term "benzenoid arenes" is art-recognized and may refer to species comprising 6-membered all-carbon, aromatic ring structures. Examples of benzenoid arenes include benzenes, anilines, and polycyclic benzenoid aromatic hydrocarbons. Examples of polycyclic benzenoid aromatic hydrocarbons include naphthalenes, anthracenes, phenanthrenes, tetracenes, pentacenes, hexacenes, heptacenes, and pyrenes. The term "non-benzenoid aromatic compounds" is art-recognized and may refer to all-carbon, aromatic ring structures which do not consist of 6-membered rings. Examples of non-benzenoid aromatic compounds include cyclopentadienyl anions, cycloheptatrienyl cations, trans-15,16-dimethyldihydropyrene, aromatic annulenes, and azulenes.

The term "heteroarenes" is art-recognized and may refer to 3 to about 10-membered aromatic ring structures whose ring structures include one to four heteroatoms. Examples of heteroarenes include pyridines, phenanthrolines, furans, thiophenes, pyrroles, and sequences of fused heteroarenes. Examples of phenanthrolines include bathophenanthrolines. Examples of thiophenes include EDOT. The abbreviation "EDOT" is art-recognized and refers to the monomer ethylene-3,4-dioxythiophene. Examples of heteroarenes with more than one heteroatom include azoles, pyrimidines, pyrazines, pyridazines, triazines, tetrazines, and fused heteroarenes with more than one ring heteroatom. Examples of azoles include thiazoles, isothiazoles, oxazoles, imidazoles, pyrazoles, triazoles, tetrazoles, and thiadiazoles.

The term "oligomer" as used herein may refer to structures having more than one fundamental repeating unit, such as a dimer, trimer, tetramer, pentamer, hexamer, etc., but not a "monomer" (which may have only one fundamental unit). For example, oligoanilines (i.e., oligomers of aniline rather than aniline monomers) may be sublimed and delivered to the vacuum chamber to: (1) ease the oxidation process (since aniline oligomers may have lower oxidation potentials that aniline monomers), (2) accelerate conductive polymer coating growth (since "pre-assembled" aniline repeat units are essentially being introduced to the chamber in the form of oligomers), and (3) improve conductive polymer coating electrical properties (since improved polymer coating microstructures may be achieved). Examples of oligomers of thiophenes include bithiophene, terthiophene, sexithiophene, and oligothiophenes. Examples of oligomers of pyridines include bipyridine, terpyridine, and oligopyridines. Oligomers (such as oligomers of thiophenes, oligomers of pyrroles, oligomers of pyridines, and oligomers of anilines) may include metal-organic compounds.

The term "metal-organic compound" includes structures comprising one or more metal species (atoms or ions) and one or more organic species (atoms, ions, or molecules based on the elements C, H, N, S, O, P, etc.) in a bonding relationship. The term "metal-organic compound" includes monomer-metal complexes and oligomer-metal complexes. The metal-organic compounds disclosed herein include salts, coordination compounds, sandwich compounds, half sandwich compounds, and multidecker sandwich compounds. Coordination compounds include monodentate complexes, bidentate complexes, tridentate complexes, tetradentate complexes, porphines, porphyrins, and hemes. Examples of monodentate complexes include metal-thiophene complexes and metal-pyrrole complexes. Examples of bidentate complexes include iron bipyridyl complexes, ruthenium bipyridyl complexes, and osmium bipyridyl complexes. Sandwich compounds include metallocene complexes, such as ferrocene.

The term "substituents" is art-recognized and may refer to chemical groups which replace the hydrogen atom that would ordinarily be present at a given location on the parent (i.e., unsubstituted) compound. Examples of substituents include aryl groups, alkyl groups, cycloalkyl groups, aralkyl groups, alkenyl groups, alkynyl groups, allyl groups, ionic groups, nitro groups, isocyanate groups, thiocyanate groups, hydroxyl groups, thiol groups, sulfide groups, amino groups, ether groups, aldehyde groups, ketone groups, acid groups, amide groups, ester groups, halogens, haloalkyl groups, etc.

The term, "gaseous metal-containing oxidant" as used herein can refer to metallic species which are capable of oxidizing (removing electrons from) gaseous polymerizable species disclosed herein. The gaseous metal-containing oxidants disclosed herein may not necessarily be gases at room temperature and atmospheric pressure. If such species are liquids or solids, for example, they may be evaporated at reduced pressure or by heating or both in order to carry out the disclosed process. Examples of gaseous metal-containing oxidants include iron(III) chloride, copper(II) chloride, potassium iodate, potassium chromate, aluminum chloride, stannic chloride, other salts of iron, other salts of potassium, other salts of copper, other salts of aluminum, other salts of tin, salts of gold, salts of palladium, salts of platinum, salts of cobalt, salts of manganese, salts of lead, salts of cerium, salts of antimony, salts of cadmium, salts of mercury, salts of chromium, salts of osmium, salts of iridium, salts of ruthenium, nickel compounds, molybdenum compounds, tungsten compounds, and metal-organic compounds. Silver salt oxidants are also contemplated in this disclosure. Examples of silver salts include silver hexaflouroantimonate, silver trifluoroacetate, silver trifluoromethanesulfonate, silver tetrafluoroborate, silver tetraphenylborate, and silver hexafluorophosphate. Examples of metal-organic compounds also include iron(III) tosylate and sandwich compounds. Examples of sandwich compounds include ferrocenium salts. Examples of oxidizing ferrocenium salts include ferrocenium tetrafluoroborate, ferrocenium hexafluorophosphate, and acetylferrocenium tetrafluoroborate. The ferrocenium salts may have substituents.

The term "particle forming agent" may refer to a species that converts metal ions into metal particles. Examples of particle forming agents include reducing agents and hydrogen sulfide. The term "reducing agent" is art-recognized and may refer to a species that donates electrons to another species. The reducing agent may be a liquid, solid, or gaseous. Examples of reducing agents include sodium metal, lithium metal, lithium-mercury, potassium metal, sodium-mercury, anthracene anion, sandwich compounds, benzophenone anion, acenaphthalenide anion, hydrazine, triethylamine, salts of biphenyl anion, lithium compounds, and potassium compounds. Examples of gaseous reducing agents include hydrogen, carbon monoxide, and metal. An example of a metal gaseous reducing agent is magnesium. A conductive polymer coating on a surface formed using the process disclosed herein may be exposed to a particle forming agent. This has the effect of forming metallic particles (which may be zero-valent) within the conductive polymer coating. Such metal particles may improve the EMI shielding efficiency and increase the electrical conductivity of the conductive polymer coating. Exposing a conductive polymer coating on a surface to a reducing agent may also yield n-type conductive polymer coatings.

The term "surface" or "surfaces" can mean any surface (external or internal) of any material, including polymers, plastics, particles, glass, metals, paper, fabric and the like. It can include surfaces constructed out of more than one material, including composite and coated surfaces. The surface may be treated chemically, photochemically, using a plasma, using a corona discharge, etc. in a manner advantageous to the end application of the coated surface and prior to coating with conductive polymer. Examples of surfaces include foams, aerogels, xerogels, fabrics, textiles, fibers, electrospun fibers, non-woven fiber mats, particles, sintered particles, membranes, and fiber-on-end membranes. Examples of surface materials include conductive polymers, polyphenylsulfone, paper, ceramic, carbon, nylon, polystyrene, polyimide, polyphenylene sulfide, aromatic polymers, phenylsilane, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET). A surface which has been first contacted with a gaseous metal-containing oxidant is referred to herein as an "oxidant enriched surface".

The term "aromatic" is art-recognized and can refer to species having planar monocyclic rings in which each ring atom has a p orbital and containing $(4n+2)\pi$ electrons. In a preferred embodiment, the surface is aromatic.

The oxidant-enriched surface may be contacted with a gaseous base to neutralize acid formed during the polymerization, acid which might otherwise chemically-degrade the growing film. The gaseous bases disclosed herein may not necessarily be gases at room temperature and atmospheric pressure. If the bases are liquids or solids under these conditions, for example, they may be evaporated at reduced pressure or by heating or both in order to carry out the disclosed process. For example, pyridine vapor or aliphatic amine vapor may be used as the gaseous base.

The term "subambient temperature medium" as used herein can refer to a device or substance that lowers the temperature of the surface to a temperature below ambient temperature. Maintaining the surface at subambient temperature encourages gaseous polymerizable species to remain adsorbed to the surface when the surface is not oxidant-enriched. The adsorbed polymerizable species may then be contacted with a gaseous metal-containing oxidant to form a conductive polymer coating on a surface. The subambient temperature medium may be selected from the group consisting of a cold finger, a refrigerated stage, a thermoelectric cooler, and a cryogenically-cooled material.

The abbreviation "sccm" is art-recognized and refers to a gas flow rate expressed in terms of standard cubic centimeters per minute.

The gaseous polymerizable species may be selected from the group consisting of monomers, oligomers, and metal-organic compounds (including monomer-metal complexes and oligomer-metal complexes). The gaseous polymerizable species include arenes and heteroarenes. Examples of gaseous polymerizable species include metal-organic compounds, thiophenes, pyrroles, anilines, pyridines, phenanthrolines, furans, heteroarenes with more than one ring heteroatom, oligomers of thiophenes, oligomers of pyrroles, oligomers of anilines, benzenoid arenes, and non-benzenoid aromatic compounds. It should be understood that other examples of gaseous polymerizable species may also be suitable. In a preferred embodiment, the gaseous polymerizable species is EDOT monomer. In another preferred embodiment, the gaseous polymerizable species is pyrrole monomer. One or more gaseous polymerizable species (e.g., pyrrole and pyrrole-3-acetic acid) may be introduced into the vacuum chamber during conductive polymer coating formation, such as in the formation of copolymer coatings, layered coatings, or functionally-graded coatings. (In functionally-graded coatings, the function of the coating varies across the coating thickness.) Copolymer coatings may be useful for incorporating multiple functionalities into a single coating, such as hydrophilicity, hydrophobicity, ionic charge, fluorescence, electroluminescence, electron transport, hole transport, electrostatic discharge, resistive heating, ion transport, chelation, drug release, corrosion resistance, abrasion resistance, etc.

Examples of gaseous metal-containing oxidants that may be used include iron(III)chloride, copper(II)chloride, potassium iodate, potassium chromate, aluminum chloride, stannic chloride, other salts of iron, other salts of potassium, other salts of copper, other salts of aluminum, other salts of tin, salts of gold, salts of palladium, salts of platinum, salts of cobalt, salts of manganese, salts of lead, salts of cerium, salts of antimony, salts of cadmium, salts of mercury, salts of chromium, salts of osmium, salts of iridium, salts of ruthenium, nickel compounds, molybdenum compounds, tungsten compounds, silver hexaflouroantimonate, silver trifluoroacetate, silver trifluoromethanesulfonate, silver tetrafluoroborate, silver tetraphenylborate, silver hexafluorophosphate, iron(III) tosylate, ferrocenium tetrafluoroborate, ferrocenium hexafluorophosphate, and acetylferrocenium tetrafluoroborate. Metal organic compounds used as oxidants may have substituents. It should be understood that other examples of gaseous metal-containing oxidants may also be suitable.

Surfaces to be enriched with oxidant and contacted with gaseous polymerizable species include foams, aerogels, xerogels, fabrics, textiles, fibers, electrospun fibers, particles, sintered particles, membranes, fiber-on-end membranes, conductive polymers, polyphenylsulfone, non-woven fiber mats, paper, ceramic, carbon, nylon, polystyrene, polyimide, polyphenylene sulfide, aromatic polymers, phenylsilane, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET). In a preferred embodiment, the surface is aromatic. It should be understood that other examples of surfaces may also be suitable. The surface may be contacted with a gaseous base.

Introduction of gaseous metal-containing oxidant into the vacuum chamber may precede or be carried out simultaneously with introduction of the one or more gaseous polymerizable species into the vacuum chamber. That is, the surface to be coated may first be contacted with a gaseous metal-containing oxidant, thereby forming an oxidant-enriched surface. In a preferred embodiment, the gaseous metal-containing oxidant is iron(II) chloride (also known as ferric chloride). In another preferred embodiment, the gaseous metal-containing oxidant is copper(II) chloride. This oxidant-enriched surface may then be contacted with one or more gaseous polymerizable species, forming a conductive polymer coating on a surface. In this case, the gaseous polymerizable species polymerize on contact with the oxidant-enriched surface due to oxidation of the polymerizable species, followed by coupling of multiple polymerizable species together to form conductive polymer chains.

Alternatively, introduction of one or more gaseous polymerizable species into the vacuum chamber may precede introduction of the gaseous metal-containing oxidant. That is, a polymerizable species-enriched surface may be contacted with a gaseous metal-containing oxidant, thereby forming a conductive polymer coating on a surface. In this case, the polymerizable species on the surface polymerizes on contact with the oxidant due to oxidation of the polymerizable species, followed by coupling of multiple polymerizable species together to form conductive polymer chains.

Surfaces to be enriched with polymerizable species and contacted with gaseous metal-containing oxidant include foams, aerogels, xerogels, fabrics, textiles, fibers, electrospun fibers, particles, sintered particles, membranes, fiber-on-end membranes, conductive polymers, polyphenylsulfone, non-woven fiber mats, paper, ceramic, carbon, nylon, polystyrene, polyimide, polyphenylene sulfide, aromatic polymers, phenylsilane, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET). The surface may be contacted with a gaseous base.

A polymerizable species-enriched surface may be formed by lowering the temperature of the surface to encourage adsorption of the polymerizable species. The surface temperature may be lowered by contacting the surface with a subambient temperature medium, such as a cold finger, a refrigerated stage, a thermoelectric cooler, or a cryogenically-cooled material. The surface temperature may be lowered at any point before, during, or after introduction of the gaseous polymerizable species to the vacuum chamber. Such an approach may be advantageous for improving conformal coverage of high-surface-area surfaces (i.e., surface porosity) by the conductive polymer coating formed by the processes disclosed. That is, when the gaseous polymerizable species is introduced to the vacuum chamber (and hence to the surface to be coated) first, the gaseous polymerizable species is given time to fully suffuse the surface porosity without reaction with oxidant. Lowering the surface temperature encourages the polymerizable species to remain adsorbed to the surface and await contact with the gaseous metal-containing oxidant.

Assuming that the polymerizable species has thus uniformly coated the surface, affording a polymerizable species-enriched surface, it may not be necessary for the metal-containing oxidant to also uniformly coat the surface in order to achieve a uniform conductive polymer coating. The metal-containing oxidant may be needed in order to initiate polymerization of the polymerizable species. Thereafter, polymerization may take place via chain reaction mechanisms in regions that may not be directly contacted by the oxidant.

The surface to be coated with conductive polymer may be patternwise-contacted with a gaseous polymerizable species and with a gaseous metal-containing oxidant, thereby forming conductive polymer coatings in the exposed regions. This patternwise exposure may be carried out using a mask, such as a physical mask or shadow mask, the mask having physical openings which may allow the gaseous species to contact the substrate only in specific regions, i.e., in a desirable pattern.

Such a pattern may define a set of electrodes (formed by the conductive polymer coating disclosed here) for an electronic device (e.g., a flat-panel or flexible display, a photovoltaic device, an ultracapacitor, a sensor, etc.), a configuration suitable for resistively-heating media in contact with the conductive polymer coating on a surface, or an EMI shield (formed by the conductive polymer coating disclosed here). The patterned EMI shield thus formed may allow passage of signals having certain frequencies within the electromagnetic spectrum but not others.

In another embodiment, the surface is contacted with a gaseous metal-containing oxidant, thereby forming an oxidant-enriched surface. This oxidant-enriched surface can be contacted with one or more gaseous polymerizable species, wherein said gaseous polymerizable species is selected from the group consisting of arenes and heteroarenes, thereby forming a conductive polymer coating on a surface. The arenes and heteroarenes are selected from the group consisting of monomers, oligomers, and metal organic compounds (including metal complexes of monomers and metal complexes of oligomers). Further, the arenes and heteroarenes may have substituents. In a preferred embodiment, the heteroarenes are selected from the group consisting of thiophenes, pyrroles, anilines, pyridines, phenanthrolines, and furans. In a more preferred embodiment, the thiophene is EDOT. The surface may be contacted with a gaseous base. The conductive polymer coating on a surface is exposed to a particle forming agent, thereby forming metallic particles within the conductive polymer. Examples of particle forming agents include reducing agents and hydrogen sulfide. These particles (which may be zero-valent metal particles or metal sulfide particles) may range in size from a few nanometers or smaller to at least tens of nanometers (e.g., 20-50 nm). Metal particles formed using this process may include particles based on silver, iron, copper, nickel, cobalt, manganese, zinc, lead, or tin. For example, zero-valent silver(0) particles can be formed within conductive polymer coatings that contain silver (I) salts by exposing the coatings to hydrogen gas. Metal sulfide-containing coatings can be formed by exposing conductive polymer coatings that contain metal salts [e.g., based on Zn(II) or Pb(II)] to hydrogen sulfide gas (e.g., forming ZnS or PbS particles). The particle forming agent may be selected from the group consisting of hydrogen, carbon monoxide, hydrogen sulfide, and metal. In a preferred embodiment, the metal is magnesium. After exposure to a particle forming agent (e.g., a reducing agent), the conductive polymer coating may be an n-type conductive polymer coating. The conductive polymer coating may be an EMI shielding layer.

We claim:

1. A method of forming an electrically conductive polymer coating on a surface, comprising the steps of:
    contacting said surface with a gaseous metal-containing oxidant, thereby forming an oxidant-enriched surface; and
    contacting said oxidant-enriched surface with a gaseous polymerizable species, thereby forming an electrically conductive polymer coating on said surface, wherein said gaseous polymerizable species is selected from the group consisting of metal-organic compounds, pyridines, phenanthrolines, furans, heteroarenes with more than one ring heteroatom, oligomers of thiophenes, oligomers of pyrroles, oligomers of anilines, benzenoid arenes, and non-benzenoid aromatic compounds;
    wherein the surface has a first temperature at a first location, forming a coating with a first electrical conductivity at the first location, and wherein the surface has a second temperature at a second location, forming a coating with a second electrical conductivity at the second location.

2. The method of claim 1, wherein said electrically conductive polymer coating is formed by contacting said oxidant-enriched surface with more than one gaseous polymerizable species.

3. The method of claim 1, wherein said metal-organic compounds, pyridines, phenanthrolines, furans, heteroarenes with more than one ring heteroatom, benzenoid arenes, and non-benzenoid aromatic compounds are selected from the group consisting of monomers and oligomers.

4. The method of claim 1, wherein said electrically conductive polymer coating provides electromagnetic interference shielding.

5. The method of claim 1, wherein said electrically conductive polymer coating comprises impurities from the coating formation process.

6. The method of claim 1, wherein the temperature of said surface is changed during formation of the conductive polymer coating.

7. A method of forming an electrically conductive polymer coating on a surface, comprising the steps of:
    contacting said surface with a gaseous polymerizable species, thereby forming a polymerizable species-enriched surface, wherein said gaseous polymerizable species is selected from the group consisting of arenes, heteroarenes, and metal-organic compounds; and
    contacting said polymerizable species-enriched surface with a gaseous metal-containing oxidant, thereby forming an electrically conductive polymer coating on said surface;
    wherein the surface has a first temperature at a first location, forming a coating with a first electrical conductivity at the first location, and wherein the surface has a second temperature at a second location, forming a coating with a second electrical conductivity at the second location.

8. The method of claim 7, further comprising contacting said surface with a subambient temperature medium.

9. The method of claim 8, wherein said subambient temperature medium is selected from the group consisting of a cold finger, a refrigerated stage, a thermoelectric cooler, and a cryogenically-cooled material.

10. The method of claim 7, wherein said gaseous polymerizable species is selected from the group consisting of monomers and oligomers.

11. The method of claim 7, wherein said heteroarenes are selected from the group consisting of thiophenes, pyrroles, pyridines, phenanthrolines, sequences of fused heteroarenes, and furans.

12. The method of claim 7, wherein said polymerizable species-enriched surface is formed by contacting said surface with more than one gaseous polymerizable species.

13. The method of claim 7, wherein said electrically conductive polymer coating provides electromagnetic interference shielding.

14. The method of claim 7, wherein said electrically conductive polymer coating comprises impurities from the coating formation process.

15. A method of forming an electrically conductive polymer coating on a surface, comprising the steps of:
    contacting the surface with a gaseous polymerizable species, thereby forming a polymerizable species-enriched surface, wherein the gaseous polymerizable species is selected from the group consisting of arenes, heteroarenes, and metal-organic compounds contacting the polymerizable species-enriched surface with a gaseous metal-containing oxidant to initiate polymerization of the gaseous polymerizable species, thereby forming an electrically conductive polymer coating on said surface; and exposing the electrically conductive polymer coating to a particle forming agent, thereby forming metallic particles within the electrically conductive polymer coating.

16. A method of forming an electrically conductive polymer coating on a surface comprising the steps of:

contacting said surface with a gaseous metal-containing oxidant and a gaseous polymerizable species, thereby forming an electrically conductive polymer coating on said surface, wherein said gaseous polymerizable species is selected from the group consisting of arenes, heteroarenes, and metal-organic compounds; and exposing said electrically conductive polymer coating to a particle forming agent, thereby forming metallic particles within the electrically conductive polymer coating.

17. The method of claim 16, wherein said heteroarenes are selected from the group consisting of thiophenes, pyrroles, pyridines, phenanthrolines, sequences of fused heteroarenes, and furans.

18. The method of claim 16, wherein said surface is contacted with more than one gaseous polymerizable species.

19. The method of claim 16, wherein said arenes, heteroarenes, and metal-organic compounds are selected from the group consisting of monomers and oligomers.

20. The method of claim 16, wherein said electrically conductive polymer coating is an n-type electrically conductive polymer.

21. The method of claim 16, wherein contacting said surface with a gaseous metal-containing oxidant forms an oxidant-enriched surface, followed by contacting said oxidant-enriched surface with a gaseous polymerizable species, forming an electrically conductive polymer coating.

22. The method of claim 16, wherein contacting said surface with a gaseous polymerizable species forms a polymerizable species-enriched surface, followed by contacting said polymerizable species-enriched surface with a gaseous metal-containing oxidant, forming an electrically conductive polymer coating.

23. The method of claim 16, wherein said electrically conductive polymer coating provides electromagnetic interference shielding.

24. The method of claim 16, wherein said electrically conductive polymer coating comprises impurities from the coating formation process.

25. The method of claim 15, wherein the surface has a first temperature at a first location, forming a coating with a first electrical conductivity at the first location, and wherein the surface has a second temperature at a second location, forming a coating with a second electrical conductivity at the second location.

26. The method of claim 16, wherein the surface has a first temperature at a first location, forming a coating with a first electrical conductivity at the first location, and wherein the surface has a second temperature at a second location, forming a coating with a second electrical conductivity at the second location.

27. The method of claim 15, said heteroarenes are selected from the group consisting of thiophenes, pyrroles, pyridines, phenanthrolines, sequences of fused heteroarenes, and furans.

28. The method of claim 15, said arenes are selected from the group consisting of benzenoid arenes, non-benzenoid aromatic compounds and anilines.

29. The method of claim 16 said arenes are selected from the group consisting of benzenoid arenes, non-benzenoid aromatic compounds and anilines.

* * * * *

UNITED STATES PATENT AND TRADEMARK OFFICE
CERTIFICATE OF CORRECTION

PATENT NO.        : 8,227,025 B2
APPLICATION NO.   : 12/262340
DATED             : July 24, 2012
INVENTOR(S)       : Hilton G. Pryce Lewis and Erik S. Handy It is certified that error appears in the above-identified patent and that said Letters Patent is hereby corrected as shown below:

In the Claims
Claim 27, column 14, line 27, please insert --wherein-- between "claim 15," and "said heteroarenes".
Claim 28, column 14, line 31, please insert --wherein-- between "claim 15," and "said arenes".
Claim 29, column 14, line 34, please insert --, wherein-- between "claim 16" and "said arenes".

Signed and Sealed this
Sixteenth Day of April, 2013

Teresa Stanek Rea
*Acting Director of the United States Patent and Trademark Office*